US008046565B2

(12) United States Patent
Yasukawa

(10) Patent No.: US 8,046,565 B2
(45) Date of Patent: Oct. 25, 2011

(54) ACCELERATOR LOAD BALANCING WITH DYNAMIC FREQUENCY AND VOLTAGE REDUCTION

(75) Inventor: Hideki Yasukawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 350 days.

(21) Appl. No.: 11/950,901

(22) Filed: Dec. 5, 2007

(65) Prior Publication Data
US 2008/0140990 A1    Jun. 12, 2008

(30) Foreign Application Priority Data

Dec. 6, 2006  (JP) ................................. 2006-329868
Nov. 26, 2007 (JP) ................................. 2007-304273

(51) Int. Cl.
*G06F 15/16* (2006.01)
*G06F 9/46* (2006.01)
*G06F 1/00* (2006.01)

(52) U.S. Cl. ........... 712/34; 718/105; 713/322; 713/324
(58) Field of Classification Search ........................ None
See application file for complete search history.

(56) References Cited

U.S. PATENT DOCUMENTS

| 4,920,487 | A | * | 4/1990 | Baffes ............................ 718/105 |
| 5,524,242 | A | * | 6/1996 | Aida et al. ..................... 717/149 |
| 5,548,737 | A | * | 8/1996 | Edrington et al. ............. 712/200 |
| 5,987,556 | A | * | 11/1999 | Nakagawa et al. ............ 710/305 |
| 6,141,762 | A | * | 10/2000 | Nicol et al. .................... 713/300 |
| 6,397,240 | B1 | * | 5/2002 | Fernando et al. .............. 708/603 |
| 6,772,241 | B1 | * | 8/2004 | George et al. .................... 710/36 |
| 6,804,790 | B2 | * | 10/2004 | Rhee et al. ..................... 713/320 |
| 6,928,566 | B2 | * | 8/2005 | Nunomura ..................... 713/322 |
| 7,139,921 | B2 | * | 11/2006 | Sherburne, Jr. ................ 713/322 |
| 7,167,994 | B2 | * | 1/2007 | Zdravkovic .................... 713/322 |
| 2002/0002578 | A1 | * | 1/2002 | Yamashita ..................... 709/105 |
| 2002/0023069 | A1 | * | 2/2002 | Blank et al. ........................ 707/1 |

(Continued)

FOREIGN PATENT DOCUMENTS

JP        2005-267635        9/2005

OTHER PUBLICATIONS

Wikipedia (Graphics processing unit entry, Nov. 30, 2005 revision); accessed Dec. 29, 2009.*

(Continued)

*Primary Examiner* — Keith Vicary
(74) *Attorney, Agent, or Firm* — Sprinkle IP Law Group

(57) ABSTRACT

Systems and methods for accelerators which may execute a program in conjunction with a PC are disclosed. In one embodiment, an accelerator includes a plurality of calculation units, each calculation unit operable to execute the program in parallel, an operation control unit configured to control an operation capability or a processing capability of at least one of the plurality of calculation units, and a control unit configured to determine a corresponding operation capability or processing capability for the plurality of calculation units based on load information on the program to be executed and control the operation control unit accordingly.

20 Claims, 9 Drawing Sheets

U.S. PATENT DOCUMENTS

| | | | |
|---|---|---|---|
| 2002/0188877 A1* | 12/2002 | Buch | 713/320 |
| 2005/0034002 A1* | 2/2005 | Flautner | 713/322 |
| 2005/0228967 A1 | 10/2005 | Hirairi | |
| 2006/0036878 A1* | 2/2006 | Rothman et al. | 713/300 |
| 2006/0206729 A1* | 9/2006 | Hentschel et al. | 713/300 |
| 2006/0242648 A1* | 10/2006 | Guccione et al. | 718/105 |
| 2007/0106428 A1 | 5/2007 | Omizo | |
| 2008/0059921 A1* | 3/2008 | Esliger et al. | 716/4 |
| 2008/0235364 A1* | 9/2008 | Gorbatov et al. | 709/224 |
| 2010/0169892 A1* | 7/2010 | Stam et al. | 718/105 |
| 2011/0072440 A1* | 3/2011 | Lee et al. | 718/105 |

OTHER PUBLICATIONS http://www.ageia.com/pdf/ds_product_overview.pdf, AGEIA Technologies, Inc.

Office Action for Japanese Patent Application No. 2007-304273, mailed Jun. 21, 2011, Japanese Patent Office, 6 pgs. (with English translation).

wakasugi@impress.co.jp, "Mercury, PCIe Accelerator Card equipped with Cell," Aug. 2, 2006, PC Watch, searched on Jun. 13, 2011, internet <URL: http://pc.watch.impress.co.up/dcs/2006/0802/mercury.htm>, 3 pgs. (with English translation).

* cited by examiner

START
↓
TRANSMIT IMAGE RECOGNITION PROGRAM — S1
↓
TRANSMIT ADDRESSES OF TARGET DATA AND OUTPUT DATA, LOAD INFORMATION AND DEGREE OF PARALLELISM INFORMATION — S2
↓
END

|  | LOAD INFORMATION | DEGREE OF PARALLELISM INFORMATION |
|---|---|---|
| PROCESSING PROGRAM A | 2 | 4 |
| PROCESSING PROGRAM B | 1 | 1 |
| PROCESSING PROGRAM C | 1 | 4 |
| ⋮ | ⋮ | ⋮ |

|  | LOAD INFORMATION | DEGREE OF PARALLELISM INFORMATION |
|---|---|---|
| RESOLUTION 1 | 1 | 2 |
| RESOLUTION 2 | 2 | 2 |
| RESOLUTION 3 | 3 | 2 |
| RESOLUTION 4 | 4 | 2 |

ACCELERATOR LOAD BALANCING WITH DYNAMIC FREQUENCY AND VOLTAGE REDUCTION

CROSS REFERENCE TO RELATED APPLICATION

This application is based upon and claims the benefit of priority from the prior Japanese Patent Application No. 2006-329868 filed on Dec. 6, 2006 and the prior Japanese Patent Application No. 2007-304273 filed on Nov. 26, 2007; the entire contents of which are incorporated herein by this reference.

BACKGROUND OF THE INVENTION

1. Field of the Invention

The present invention relates to an accelerator, an information processing apparatus and an information processing method, and more particularly, to an accelerator having multiple calculation units which can connect to an information processing apparatus and execute a program by processing the program in parallel, the information processing apparatus connected to the accelerator, and an information processing method.

2. Description of the Related Art

Conventionally, there has been known a technique configured to attach a device having a calculation function to an information processing apparatus and cause the attached device to share a part of a process to be executed. For example, there is a technique in which the device having the calculation function, which is called "accelerator", is mounted in a personal computer (hereinafter referred to as "PC") as the information processing apparatus and a Central Processing Unit (hereinafter referred to as "CPU") in a body of the PC causes the accelerator to share the process of a program, with an intention of improving a processing speed.

Recently, an information processing apparatus having the accelerator attached to its body unit, not only with an intention of sharing the process or improving the processing speed, but also in consideration of power consumption, has also been proposed, for example, in Japanese Patent Laid-Open No. 2003-15785.

According to a technique according to the proposition, the CPU at the body unit side reads performance information on the attached accelerator, and based on the performance information, determines and sets a driving voltage or a driving frequency for the accelerator, which enables the accelerator to be driven correspondingly to a low power consumption mode and the like.

However, in the case of the information processing apparatus according to the above described proposition, since the CPU at the body unit side determines the driving voltage and the like for the accelerator, the CPU has to execute a determination process thereof, causing an overhead in the CPU.

Moreover, the information processing apparatus according to the above described proposition has not considered such a case where there are multiple calculation units within the accelerator.

SUMMARY OF THE INVENTION

Systems and methods for accelerators which may execute a program in conjunction with an information processing apparatus are disclosed. In one embodiment, an accelerator includes a plurality of calculation units, each calculation unit operable to execute the program in parallel, an operation control unit configured to control an operation capability or a processing capability of at least one of the plurality of calculation units, and a control unit configured to determine a corresponding operation capability or processing capability for the plurality of calculation units based on load information on the program to be executed and control the operation control unit accordingly.

DETAILED DESCRIPTION OF TEE PREFERRED EMBODIMENTS

Embodiments of the present invention will be described below with reference to the drawings.

First Embodiment

Figure 1:
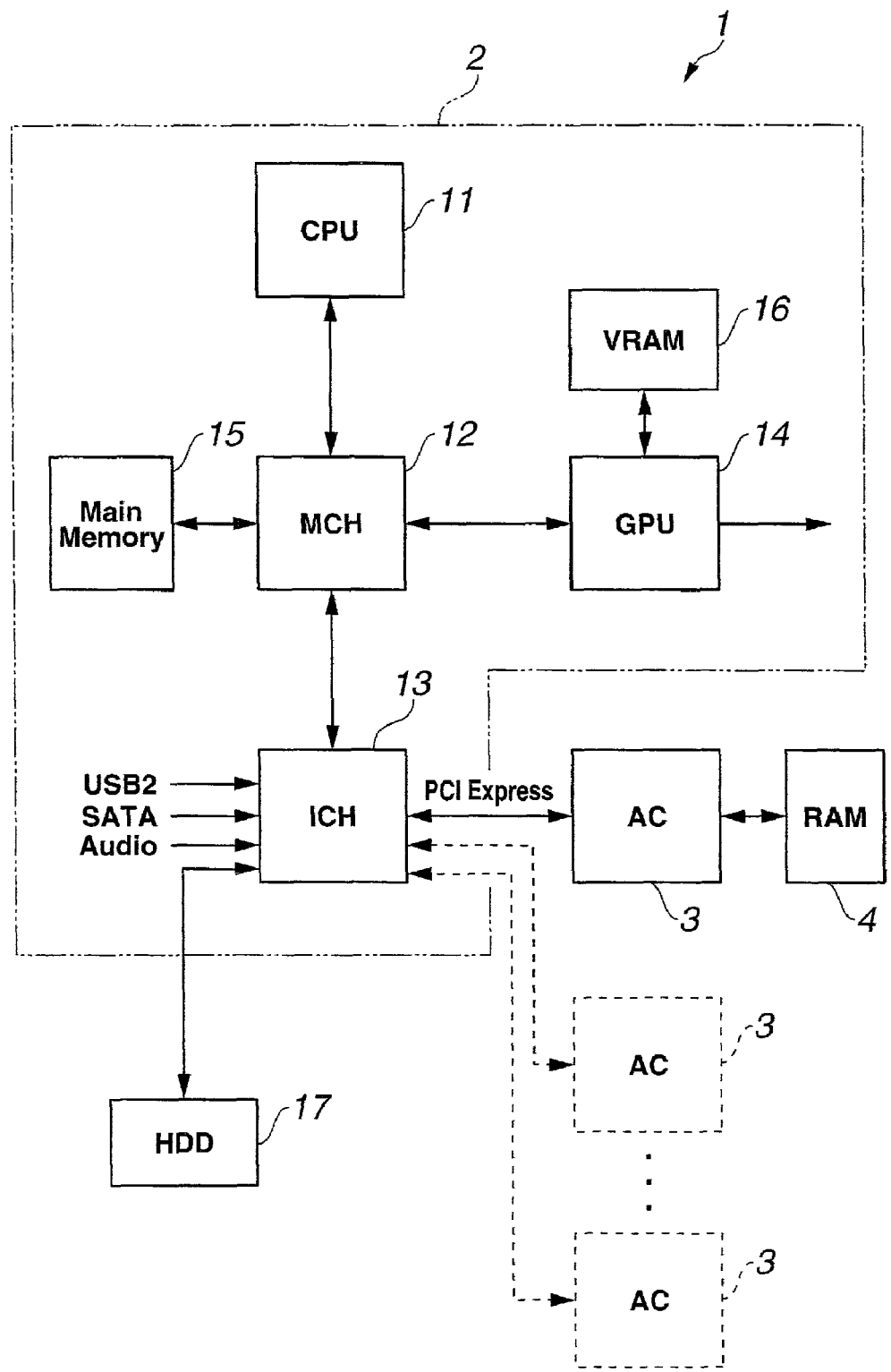
FIG. 1 is a configuration diagram showing a configuration of an information processing apparatus according to a first embodiment of the present invention.

First, based on FIG. 1, a configuration of an information processing apparatus according to a first embodiment of the present invention will be described. FIG. 1 is a configuration diagram showing the configuration of the information processing apparatus according to the present embodiment.

An information processing apparatus 1 is configured to include a PC 2 which is a computer having a PC architecture. An accelerator 3 is attachable to, that is, connectable to the PC 2. The PC 2 is an information processing apparatus configured to include a CPU (Central Processing Unit) 11, an MCH (Memory Controller Hub) 12, an ICH (I/O Controller Hub) 13, a GPU (Graphics Processing Unit) 14, a main memory 15 and a VRAM (Video RAM) 16 as an image memory. Thus, the information processing apparatus 1 is configured in which the accelerator 3 is connected to the PC 2 having such a PC architecture. It should be noted that although an example of the PC architecture including of the CPU 11, the MCH 12, the ICH 13 and the GPU 14 is shown as the PC architecture in the present embodiment, the PC architecture is not limited to such a configuration.

Particularly, the MCH 12 is a semiconductor device chip having so-called Northbridge functionality including functions of connection between the CPU 11 and the main memory 15 and the like. The ICH 13 is a semiconductor device chip having so-called Southbridge functionality, such as connecting to another component such as a hard disk device (hereinafter referred to as "HDD") 17 via a PCI bus, a USB or the like, and here, the ICH 13 controls input/output of each signal depending on standards such as USB2, SATA (Serial ATA), Audio and PCI Express. Moreover, the GPU 14, which is a processing unit for graphics, is a so-called graphic engine and is a semiconductor device chip configured to perform a calculation process required for displaying three-dimensional graphics.

The accelerator (hereinafter abbreviated as "AC") 3 as an additional device having a calculation function is a chip which is connected to the ICH 13 and further also connected to a RAM (may be a flash memory or the like) 4 as its own working memory. A configuration of the AC 3 as a peripheral device will be described later. It should be noted that the RAM 4 may be provided within the AC 3.

The CPU 11 can execute various application programs, including high load programs and low load programs. Therefore, the CPU 11 can request and cause the AC 3 to execute high load application programs, for example, an image recognition application program, an application program for video replay and the like. Specifically, if the AC 3 is used to execute an application program in the information processing apparatus 1, the CPU 11 outputs a predetermined command with respect to the AC 3, and the AC 3 receives the command and performs a process of the program specified by the CPU 11. In that case, for example, if the AC 3 performs the specified process, for example, an image recognition process, the AC 3 reads a stream signal from the SATA or the like via DMA, performs the recognition process, transfers result data of the recognition process to the GPU 14 and the like via the DMA, and outputs the result data.

The PCI Express has one or more lanes. The ICH 13 and the AC 3 are connected via the PCI Express having a predetermined number of lanes, for example, 1, 2, 4 or 8 lanes or the like. The number of the lanes is set by BIOS or the like. For example, the ICH 13 and the AC 3 are connected via a 4-lane PCI Express.

It should be noted that, as shown by dotted lines in FIG. 1, multiple ACs 3 may be connected to the ICH 13 so that each of the multiple ACs 3 is connected to each lane of the PCI Express. Consequently, an application program with a high calculation processing load can be accommodated by increasing the number of processing units as described below.

Furthermore, it should be noted that when the multiple ACs 3 are connected to the ICH 13, each AC 3 and the ICH 13 may be connected via multiple lanes.

The AC 3 is a processor of a semiconductor device, which has multicore/multiprocessor architectures capable of parallel processing, and controls an operation and a processing capability of each calculation unit.

In the present embodiment, the AC 3 includes multiple calculation units capable of processing the program in parallel, and when the AC 3 executes the specified process, the AC 3 itself determines sharing of the process among the multiple calculation units and causes the respective calculation units to execute the process. In the determination of the sharing, the AC 3 itself determines which calculation unit among the multiple calculation units is caused to execute the process, supplies power to the calculation unit which executes the process, and also determines and sets an operating frequency in the execution thereof.

Figure 2:
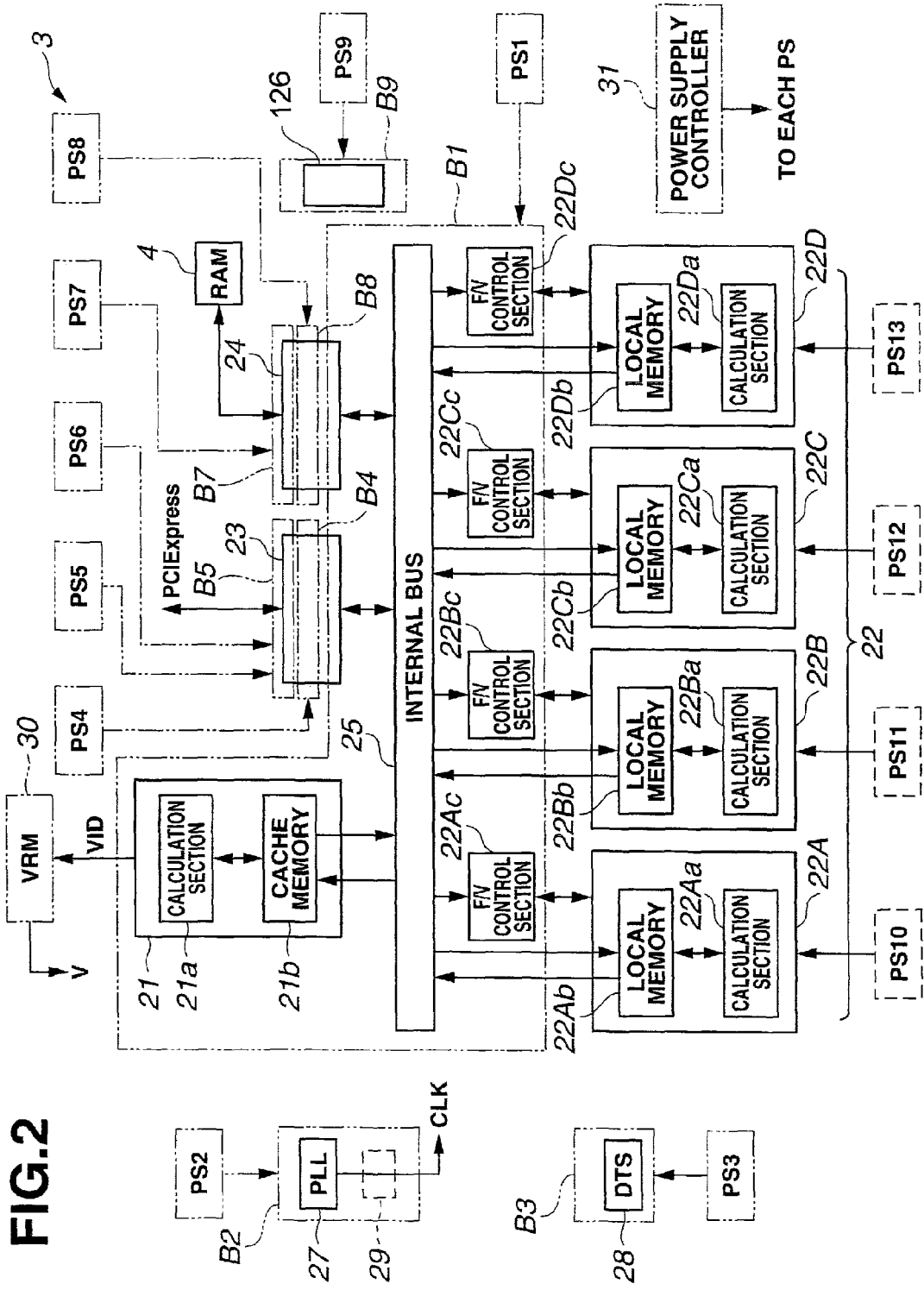
FIG. 2 is a block diagram illustrating a configuration of an accelerator according to the first embodiment of the present invention.

Next, the configuration of the AC 3 will be described. FIG. 2 is a block diagram illustrating the configuration of the AC 3. The AC 3 includes a control processing unit (hereinafter abbreviated as "CPE") 21, multiple, here four processing units (hereinafter abbreviated as "PEs"), and an interface unit (hereinafter abbreviated as "I/F section") 23. The four PEs are assumed as a PE 22A, a PE 22B, a PE 22C and a PE 22D, respectively. Hereinafter, the four PEs will be collectively referred to as "PE 22", or one PE will be referred to as "PE 22". Furthermore, the AC 3 includes an I/F unit 24 and can read the program and data in the RAM 4 connected to the AC 3. The CPE 21, each PE 22, the I/F unit 23 and the I/F unit 24 are connected to one another via an internal bus 25. The I/F unit 23 is a circuit configured to interface the internal bus 25 with a PC architecture bus. When the CPE 21 is powered on, the program and the data are loaded from the CPU 11 and stored in the RAM 4. It should be noted that a ROM may be provided in the AC 3, the program and the data may have been stored in the ROM, and the CPE 21 may read the program and the data from the ROM. Furthermore, other input/output terminals 126, a PLL circuit 27 and a digital temperature sensor (hereinafter abbreviated as "DTS") 28 are also provided in the chip of the AC 3.

The CPE 21 internally includes a calculation unit 21a which is a control unit and a cache memory 21b. Each PE includes the calculation unit and a local memory. Moreover, each PE is provided with a frequency/voltage control (hereinafter abbreviated as "F/V control") unit. Specifically, the PEs 22A, 22B, 22C and 22D (hereinafter collectively referred to as "PE 22", or one PE will be referred to as "PE 22") have calculation units 22Aa, 22Ba, 22Ca and 22Da (hereinafter collectively referred to as "calculation unit 22a", or one calculation unit will be referred to as "calculation unit 22a") and local memories 22Ab, 22Bb, 22Cb and 22Db hereinafter collectively referred to as "local memory 22b", or one local memory will be referred to as "local memory 22b"), respectively. Also, the respective PEs 22 are provided with F/V control units 22Ac, 22Bc, 22Cc and 22Dc (hereinafter collectively referred to as "F/V control unit 22c", or one F/V control unit will be referred to as "F/V control unit 22c").

The calculation unit 22a is a circuit configured to process a processing program in parallel based on a request from the CPE 21. Although the calculation unit 22a may be an application specific hardware engine, the calculation unit 22a is a programmable general purpose processing unit in the present embodiment. Each calculation unit 22a is a resource for an internal calculation in the AC 3. As will be described later, the calculation unit 22a processes the processing program in parallel by using one or more calculation units.

Here, the calculation unit 22a is a calculation unit which can perform a SIMD calculation with respect to data of 128 bit data width. Furthermore, the calculation unit 22a can perform 32-bit single precision and 64-bit double precision floating calculations.

Each local memory 22b is a storage unit configured to store the processing program and target data which is data to be processed.

For example, in each PE 22, if the image recognition process with respect to image data, or codec processes such as encoding and decoding processes with respect to the image data are performed, the data to be processed which has been read from the HDD 17 or a camera (not shown) is stored in each local memory 22b, in a state of having been divided depending on a capacity of each local memory 22b. Then, each calculation unit 22a executes a predetermined process with respect to the stored data with the SIMD calculation, and stores a result of the execution in each local memory 22b. In each PE 22, after the predetermined process has been completed, the processed data is transferred from the local memory 22b to the HDD 17, data to be processed next is transferred from the HDD 17 to each local memory 22b, and the predetermined process is performed as described above. By repeating the above described process, in the information processing apparatus 1, the AC 3 is used to smoothly perform the image recognition process and the like.

Each F/V control unit 22c is an operation control unit configured to control both the operation and the processing capability of the corresponding calculation unit 22a, and specifically, is a circuit having a function configured to change a frequency of a clock signal supplied to the corresponding calculation unit 22a, a function configured to supply and stop the clock signal supplied to each circuit in the calculation unit 22a, and a function configured to supply and stop the power supplied to each circuit in the calculation unit 22a. It should be noted that a clock CLK supplied to each circuit is supplied from the PLL circuit 27.

It should be noted that, although here the F/V control unit 22c is provided for each PE 22, one F/V control unit 22c may be provided with respect to the whole of the four PEs 22 and the change of the frequency of the clock signal, the supply and the stop of the clock signal, and the supply and the stop of the power may be performed with respect to the whole of the four PEs 22. In that case, an output of the PLL circuit 27 is outputted via a switching circuit 29 shown by a dotted line in FIG. 2, and a control signal configured to stop the supply of the clock is supplied with respect to the switching circuit 29 from the CPE 21.

As will be described later, a function configured to change the operating frequency is a function configured to reduce the operating frequency of each calculation unit 22a in each PE 22 and optimize power consumption due to the clock signal, if a calculation performance which can be provided by each calculation unit 22a in each PE 22 is high in comparison with a load of the processing program.

The function configured to supply and stop the clock signal, that is, a clock gating function is a function configured to supply and stop the clock signal with respect to each calculation unit 22a in each PE 22 and the like. When the supply of the clock signal is stopped, the power consumption due to the clock signal can be reduced to 0 (zero).

The function configured to supply and stop the power is a function configured to supply and stop the power with respect to each calculation unit 22a in each PE 22 and the like. When the supply of the power is stopped, the power consumption due to a leak current in an internal circuit can be reduced to 0 (zero).

The clock frequency supplied to each calculation unit 22a shows the processing capability of each calculation unit 22a. When the operating frequency is a maximum operating frequency which has been previously determined with respect to each calculation unit 22a, the processing capability of the calculation unit 22a is maximized, and each F/V control unit 22c can control the processing capability of the calculation unit 22a to be less than or equal to its maximum processing capability by changing the operating frequency to be less than or equal to its maximum operating frequency.

Moreover, each F/V control unit 22c can stop the operation of each calculation unit 22a by stopping the supply of the clock signal to be supplied to each calculation unit 22a. Similarly, each F/V control unit 22c can stop the operation of the calculation unit 22a by stopping the supply of the power to be supplied to each calculation unit 22a, for example, a supply voltage. Therefore, each F/V control unit 22c can control the operation of each calculation unit 22a by changing the frequency of the clock signal to the calculation unit 22a, controlling the supply of the clock signal, that is, performing clock gating, or controlling the supply of the power to each calculation unit 22a.

It should be noted that although each F/V control unit 22c controls both the operation and the processing capability of the corresponding calculation unit 22a in the present embodiment, each F/V control unit 22c may control at least one of the operation and the processing capability.

As will be described later, the calculation unit 21a of the CPE 21 controls each PE 22 and each F/V control unit 22c. Thus, the control of the operation and the processing capability of the calculation unit 22a by each F/V control unit 22c is performed in response to an instruction from the calculation unit 21a of the CPE 21.

As described above, when the calculation unit 21a which is the control unit receives the command of executing the predetermined process from the CPU 11, the calculation unit 21a outputs a predetermined instruction with respect to the four PEs 22. The predetermined instruction includes an instruction on which PE 22 executes the process, an instruction on which operating frequency is provided at that time, and the like.

Moreover, the CPE 21 of the AC 3 outputs a predetermined code signal VID, for example, a 6-bit signal, with respect to a VRM (Voltage Regulator Module) 30 which is a variable power supply and an external power supply circuit module, and the VRM 30 supplies a power supply voltage V depending on the predetermined code signal VID to the AC 3.

Furthermore, the respective circuits on the AC 3 are divided into multiple blocks, which are 13 blocks here, and the AC 3 is configured so that the power is separately supplied for each divided block. In other words, with respect to each power supply, a block of circuit parts to which its power is supplied has been previously determined, and each power supply supplies the power only to the corresponding block which has been previously determined. Specifically, a block B1 including the CPE 21 is supplied with the power from a power supply PS1 for internal logics. A block B2 including the PLL circuit 27 is supplied with the power from an analog power supply PS2 for a PLL unit. A block B3 including the DTS 28 is supplied with the power from an analog power supply PS3 for a digital temperature sensor unit. A block B4 including a part of the I/F 23 for the PCI Express is supplied with the power from a power supply PS4 for a first PCI Express logic. A block B5 including other parts of the I/F 23 for the PCI Express is supplied with the power from a power supply PS5 for a second PCI Express logic and the power from an analog power supply PS6 for the PCI Express. A block B7 including a part of the I/F 24 is supplied with the power from an analog power supply PS7 for the I/F 24. A block B8 including other parts of the I/F 24 is supplied with the power from a power supply PS8 for an I/F 24 logic. A block B9 including the other input/output terminals 26 is supplied with the power from a power supply PS9 for the other input/output terminals 26. The respective four PEs 22 are supplied with the power from power supplies for the PE, PS10, PS11, PS12 and PS13, respectively.

For example, in a state where the application program is executed and the AC 3 is used, the CPU 11 controls the power supply from the respective power supplies so that the respective circuit units are supplied with the power from all of the power supplies PS1 to PS13. Moreover, for example, in a state where the AC 3 is not used, the CPU 11 controls the power supply so that unnecessary power is not supplied. More specifically, when the CPU 11 instructs a device state with respect to the AC 3, the CPE 21 receives information on the device state, and depending on the information, instructs power supply states of the respective power supplies PS1 to PS13 with respect to an external power supply controller 31. According to the instruction on the power supply states, the external power supply controller 31 changes the power supply states of the respective power supplies PS1 to PS13. The device state includes states such as a full state D0 of supplying the power from all of the power supplies PS1 to PS13 as described above, a state D1 of performing the power supply only from some power supplies among the power supplies PS1 to PS13, and a so-called sleep state D2.

As described above, depending on the state of the information processing apparatus 1, here, depending on a usage state of the AC 3, the CPU 11 controls the power supply with respect to each block in the AC 3.

Figures 3, 4:
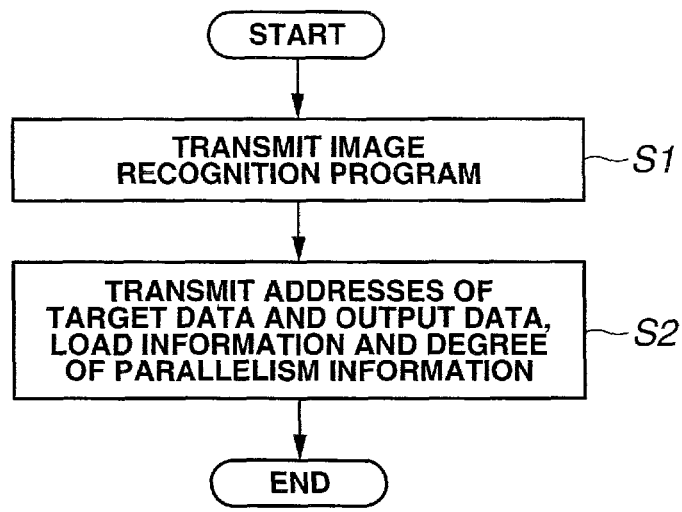
FIG. 3 is a flowchart showing an example of a flow of a process in a CPU according to the first embodiment of the present invention.
FIG. 4 is a diagram showing an example of table data showing load information and degree of parallelism information according to the first embodiment of the present invention.

FIG. 3 is a flowchart showing an example of a flow of the process in the CPU 11. A processing program in the CPU 11 is stored in the main memory 15, and executed by the CPU 11.

An example of a case of causing the AC 3 to share one process, which is the image recognition process here, in the middle of executing various processes by the CPU 11 will be described. After the CPU 11 has executed a predetermined preprocess before requesting the process with respect to the AC 3, the CPU 11 transmits the image recognition program to the AC 3 (step S1). The calculation unit 21a of the CPE 21 stores the image recognition program from the CPU 11 in the RAM 4.

Next, the CPU 11 transmits an address of target data which is a target of the image recognition process, an address of result data of the recognition process, load information on the image recognition program, and degree of parallelism information on the image recognition program to the AC 3 (step S2). The AC 3 accumulates the received load information and the received degree of parallelism information in the RAM 4.

The load information is information showing weight of the process, and the degree of parallelism information is information showing a degree of capability to process the processing program in parallel. In the present embodiment, an example of showing the load information and the degree of parallelism information in integers 0, 1, 2, . . . including 0 (zero) will be described. The load information shows that the larger its number is, the larger the load of the process is. The degree of parallelism information shows that the process is a process which can be executed by the number of PEs depending on its number.

The load information and the degree of parallelism information have been previously determined for each processing program and stored in the main memory 15. FIG. 4 is a diagram showing an example of table data showing the load information and the degree of parallelism information.

As shown in FIG. 4, the load information and the degree of parallelism information have been previously set for each processing program. A processing program A is shown to have the load of 2 and the degree of parallelism of 4. A processing program B is shown to have the load of 1 and the degree of parallelism of 1. A processing program C is shown to have the load of 1 and the degree of parallelism of 4.

Since the table data of FIG. 4 has been previously stored in the main memory 15, the CPU 11 can read and obtain the load information and the degree of parallelism information on the processing program which is requested with respect to the AC 3, from the main memory 15, and transmit the load information and the degree of parallelism information to the AC 3.

Figure 5:
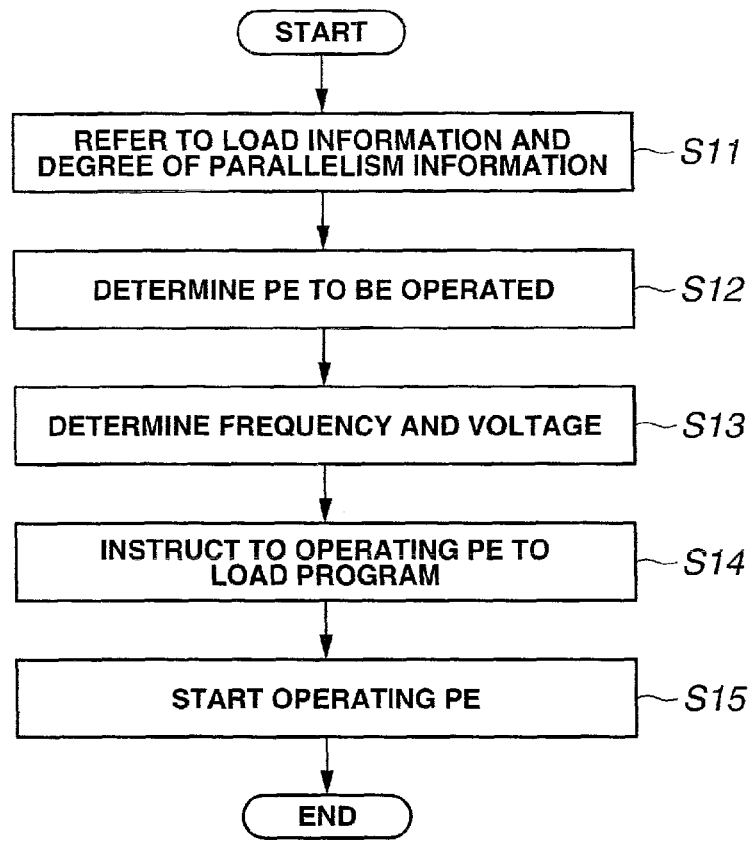
FIG. 5 is a flowchart showing an example of a process in a CPE according to the first embodiment of the present invention.

Next, a process in the calculation unit 21a of the CPE 21 in the AC 3 will be described. FIG. 5 is a flowchart showing an example of the process in the CPE 21.

When the above described process is requested from the CPU 11, the CPE 21 refers to the received load information and the received degree of parallelism information, and stores the load information and the degree of parallelism information in the RAM 4 (step S11).

The CPE 21 determines the PE to be operated, based on the load information and the degree of parallelism information (step S12). In other words, the CPE 21 couples the load information with the degree of parallelism information to determine one or more PEs 22 to be operated, and the number of operating PEs 22 is determined. In the present embodiment, the degree of parallelism shows a maximum number of the calculation units which can perform the parallel process, and assuming that an amount of process which can be executed by one PE 22 is 1, the load shows a ratio with respect to the amount of process. Thus, based on the received load information and the received degree of parallelism information, the CPE 21 can determine how many PEs 22 can execute the processing program at which operating frequency.

In a method of the determination, according to a basis of minimizing the power consumption of the AC 3, optimal PEs 22 to be operated and an optimal operating frequency are determined. Moreover, the PEs 22 which are not used for the process are controlled to minimize the power consumption, for example, the supply of the power thereto is stopped.

The CPE 21 determines the operating frequency and the supply voltage of each of the determined one or more PEs 22 to be operated (step S13). In other words, the CPE 21 determines the operating frequency and the supply voltage of each of the operating PEs 22, and controls the F/V control unit 22c to supply the clock signal corresponding to the determined operating frequency and the power of the determined voltage to each of the operating PEs 22. It should be noted that the clock signal is not supplied and also the power required for the calculation process is not supplied with respect to non-operating PEs.

Figure 6:
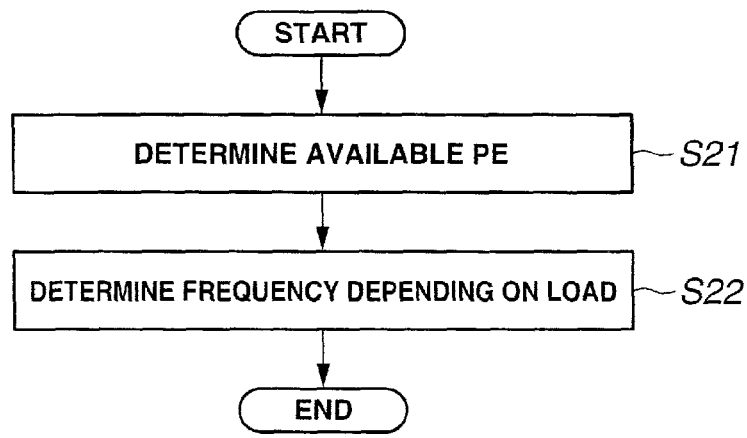
FIG. 6 is a flowchart showing an example of a flow of a process of determining an operating frequency according to the first embodiment of the present invention.

For example, the determination of the operating frequency at step S13 is performed as described below. FIG. 6 is a flowchart showing an example of a flow of a process of determining the operating frequency.

First, the CPE 21 determines the PE 22 which is currently available (step S21). In other words, when the instruction for the process is received, there may be a PE 22 already executing another process among the PEs 22 of the AC 3. The CPE is monitoring the operation of each PE 22, and can grasp what process each PE 22 is executing. Thus, before requesting the process, the CPE 21 first determines which PE 22 can execute the process and determines the available, that is, executable PE 22 (step S21).

Next, the CPE 21 determines the operating frequency and the supply voltage depending on the load, and notifies the operating frequency and the supply voltage to each F/V control unit 22c of each PE 22 (step S22). For example, like the program A shown in the table of FIG. 4, in the case of the processing program with the load of 2 and the degree of parallelism of 4, if there are three executable PEs at step S21, assuming that a maximum operable frequency of each calculation unit 22a is f, the CPE 21 performs a process of dividing 2 showing the load of the program by 3 showing the number of the executable PEs 22. Then, a value of a result of the division (2/3) is obtained. Consequently, the operating frequency of the calculation unit 22a of the PE 22 becomes (2/3)f.

It should be noted that the operating frequency of the PE 22 may not be able to take the value of the division result, for example, in a case where the PE 22 is operable only at a frequency of a previously fixed value such as f, (1/2)f, (1/3)f, (1/4)f, (1/8)f and the like as the operating frequency. In such a case, the CPE 21 selects and determines a value which is close to (2/3)f and more than (2/3)f, as the operating frequency.

In this way, the CPE 21 determines the operating frequency of the PE 22 to be operated and further determines the supply voltage of the operating PE 22. The supply voltage is a voltage required for the operation, with respect to the PE 22 to be operated. With respect to the non-operating PE 22, the voltage required for the operation is not supplied, and the supply voltage becomes 0 or a voltage corresponding to minimum power consumption such as a standby state.

Returning to FIG. 5, the CPE 21 instructs the operating PE 22 to load the processing program (the image recognition program in the above described example) (step S14). Specifically, the CPE 21 notifies the address of the processing program to the PE 22, and instructs the PE 22 to load the processing program, that is, outputs a load instruction for the processing program. Consequently, the operating PE 22 loads the processing program and stores the processing program in the local memory 22b.

Then, the CPE 21 outputs a start instruction with respect to the operating PE 22 (step S15). When the PE 22 receives the start instruction, the PE 22 executes the processing program accumulated in the local memory 22b. At this time, the calculation unit 22a of each PE 22 is operating based on the operating frequency and the voltage notified and set to the F/V control unit 22c.

The PE 22 outputs the result data of the process to the address instructed at step S2.

The CPE 21 monitors the operation of each PE, and when all processes are completed, the CPE 21 executes the predetermined process.

Figure 7:
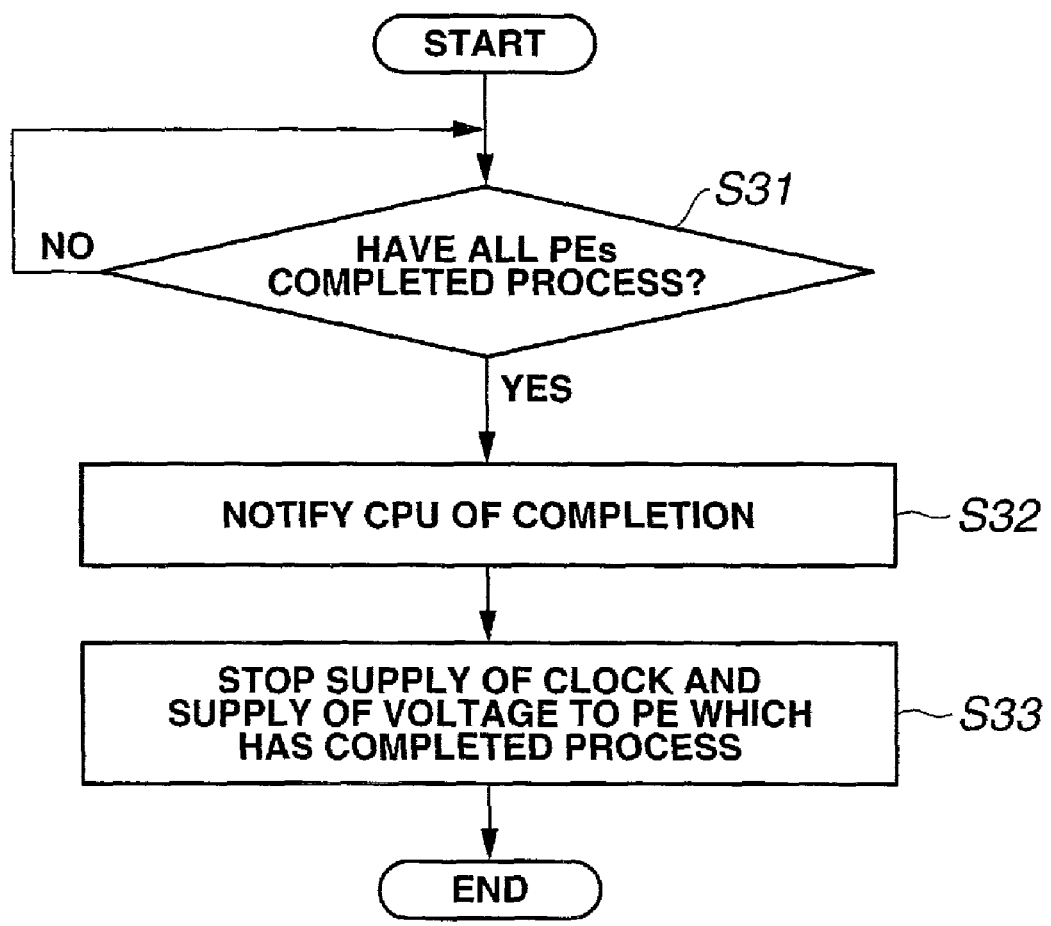
FIG. 7 is a flowchart showing an example of a flow of a process at the time of completing a processing program in a calculation unit of the CPE according to the first embodiment of the present invention.

FIG. 7 is a flowchart showing an example of a flow of the process at the time of completing the processing program in the calculation unit 21a of the CPE 21.

The CPE 21 monitors an execution state of the processing program in each PE 22, and first determines whether or not all PEs 22 to which an operation instruction of executing the processing program has been issued, have completed the process (step S31).

When all PEs 22 have completed the process, the CPE 21 outputs a completion notification showing that the execution of the requested processing program has been completed, to the CPU 11 (step S32).

Then, the CPE 21 stops the supply of the clock signal of the operating frequency and the voltage determined at step S13, to the PE 22 which has completed the process (step S33). The stop means that the supply is set to a supply state of the clock signal of the operating frequency and the voltage in the so-called standby state.

As described above, the processing program is requested from the CPU 11 with respect to the AC 3, and executed in the AC 3.

Figure 8:
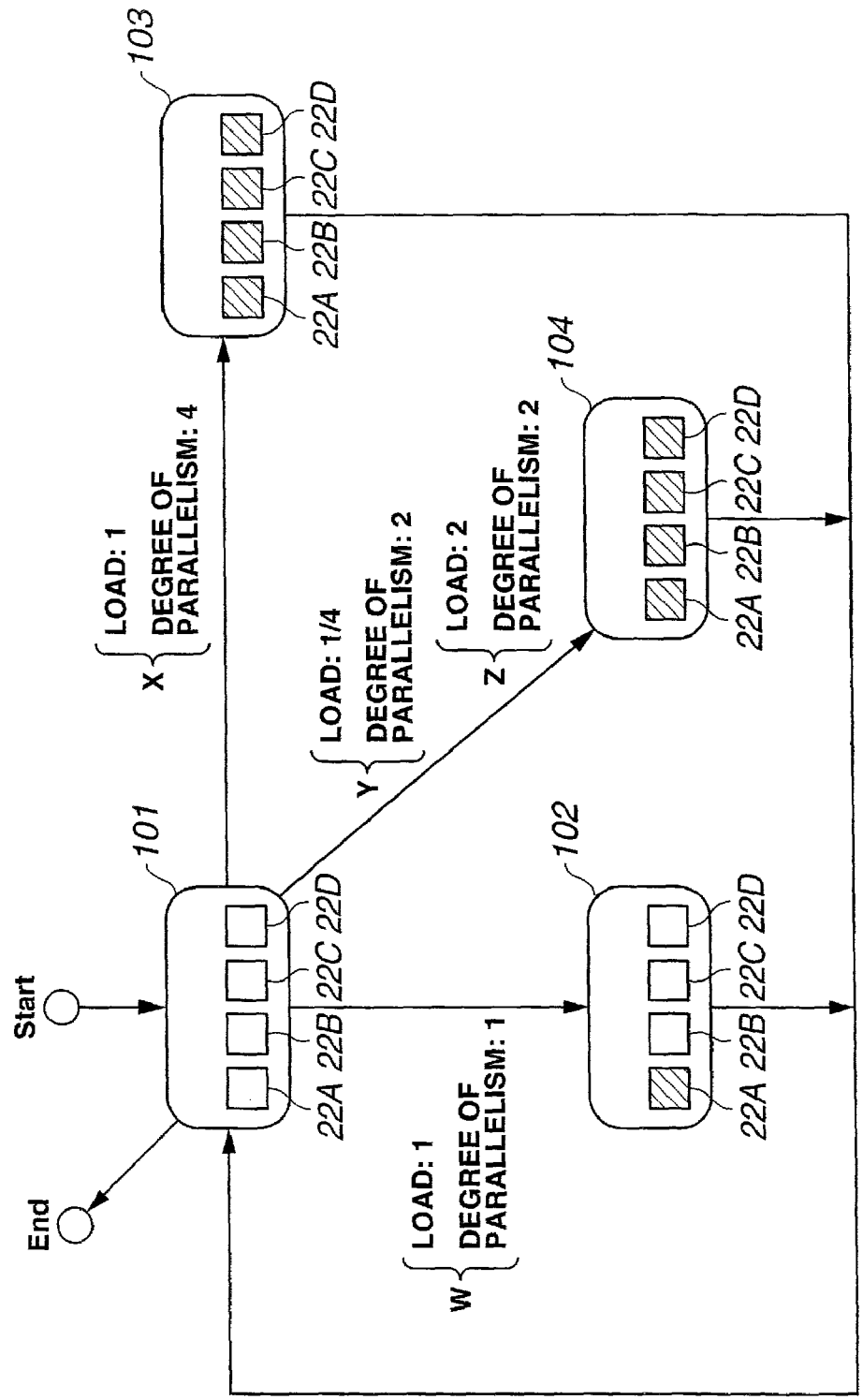
FIG. 8 is a diagram illustrating the process in the CPE according to the first embodiment of the present invention.

Next, the flow of the process as described above will be described by using a specific example. FIG. 8 is a diagram illustrating the process in the CPE 21. FIG. 8 shows an example of change in a state of the AC 3, and shows that the four PEs 22 are included. It should be noted that, in FIG. 8, a node Start shows a state before the CPE 21 operates, and a node End shows a state where the CPE 21 has completed the operation. When the CPE 21 starts the operation, the state becomes a standby state 101.

In FIG. 8, when the AC 3 is in the standby state 101, and the AC 3 in the standby state 101 is requested for a process W with the load of 1 and the degree of parallelism of 1 from the CPU 11, the state becomes a state 102.

In the standby state 101, within the AC 3, the clock gating is performed and the supply of the clock signal is stopped with respect to a circuit part to which the gating can be performed, and the clock signal having the frequency which has been lowered to a lowest possible level is supplied with respect to a circuit part in which the frequency of the clock signal can be lowered. Thus, the standby state 101 is a state of the minimum power consumption of the AC 3.

In the standby state 101, when the process W as described above is requested, the CPE 21 finds that the process W is a process with the load of 1 which can be processed by one PE 22 and the degree of parallelism of 1, and in that case, the CPE 21 sets one PE 22A as the PE to be operated, also sets the operating frequency of the PE 22A to the maximum operating frequency f, performs the clock gating and stops the supply of the power with respect to the other PEs 22B, 22C and 22D. It should be noted that a shaded PE 22A among the four PEs 22 is the operating PE in FIG. 8.

After the process W has been completed, the state returns from the state 102 to the standby state 101. Furthermore, when the AC 3 is in the standby state 101, and the AC 3 in the standby state 101 is requested for a process X with the load of 1 and the degree of parallelism of 4 from the CPU 11, the state becomes a state 103.

Specifically, when the process X as described above is requested, the CPE 21 finds that the process X is a process with the load of 1 which can be processed by one PE 22 and the degree of parallelism of 4. When an operating method with the minimum power consumption is a method configured to evenly share the load among multiple operable PEs 22, the CPE 21 sets all four PEs 22 as the PEs to be operated, also sets the operating frequency of each PE 22 to (1/4)f (f is the maximum operating frequency), and causes the PEs 22 to operate.

It should be noted that, in the case of the process X with the load of 1 and the degree of parallelism of 4, there are also other options including a method configured to execute the process by one PE at the operating frequency of (1/1)f and a method configured to execute the process by two PEs at the operating frequency of (1/2)f. However, the optimal method, that is, the method with low power consumption to be determined varies depending on an implementation method, an operation method and the like of each circuit in the AC 3.

After the process X has been completed, the state returns from the state 103 to the standby state 101. Furthermore when the AC 3 is in the standby state 101, and the AC 3 in the standby state 101 is requested for two processes, that is, a process Y with the load of 1/4 and the degree of parallelism of 2 and a process Z with the load of 2 and the degree of parallelism of 2 from the CPU 11, the state becomes a state 104.

Specifically, when the processes Y and Z as described above are requested, the CPE 21 finds that the process Y has (1/4) of the load which can be processed by one PE 22 and the degree of parallelism of 2. Also, the CPE 21 finds that the process Z has the load of 2 which can be processed by two PEs 22 and the degree of parallelism of 2. Therefore, when the operating method with the minimum power consumption is the method configured to evenly share the load among the multiple operable PEs 22, with respect to the process Y, the CPE 21 sets two PEs 22A and 22B as the PEs to be operated, also sets the operating frequency to (1/8)f and causes the PEs 22A and 22B to operate to perform the process Y. Also, with respect to the process Z, the CPE 21 sets two PEs 22C and 22D as the PEs to be operated, also sets the operating frequency to (1/1)f and causes the PEs 22C and 22D to operate to perform the process Z. In that case, the program of the process Y is loaded to the PEs 22A and 22B, and the program of the process Z is loaded to the PEs 22C and 22D.

After the processes Y and Z have been completed, the state returns from the state 104 to the standby state 101.

As described above, in the AC 3, depending on the processing program, the operation of each PE 22 is controlled so that the power consumption is optimized, that is, here the power consumption becomes low. Consequently, the power consumption in the AC 3 is controlled to dynamically change. In other words, in the AC 3, depending on the load of the processing program, the provision of the calculation unit 22a which is the internal calculation resource and its operating state are dynamically changed. Then, with respect to the calculation unit 22a of each operating PE 22, the operating frequency and the supply voltage are determined so that the power consumption is optimized in the AC 3. With respect to each non-operating PE 22, the clock gating, the stop of the supply of the voltage and the like are performed. Consequently, in the PE 22 which is not used, the power consumption due to the clock signal or occurrence of the internal leak current is reduced to be low, which can reduce useless power consumption.

Thus, according to the present embodiment, since the AC 3 autonomously determines the sharing of the process among the multiple PEs 22 therein, also determines the operation and the processing capability in consideration of the power consumption, and executes the process requested by the CPU 11, the AC 3 can perform the requested process with the optimal power consumption.

Second Embodiment

Next, a second embodiment of the present invention will be described. The AC for the information processing apparatus according to the second embodiment has not only the multiple general purpose processing units (PEs) but also multiple hard macros, and also determines the sharing of the process and controls to execute the process with the optimal power consumption with respect to operations of the multiple hard macros.

Figure 9:
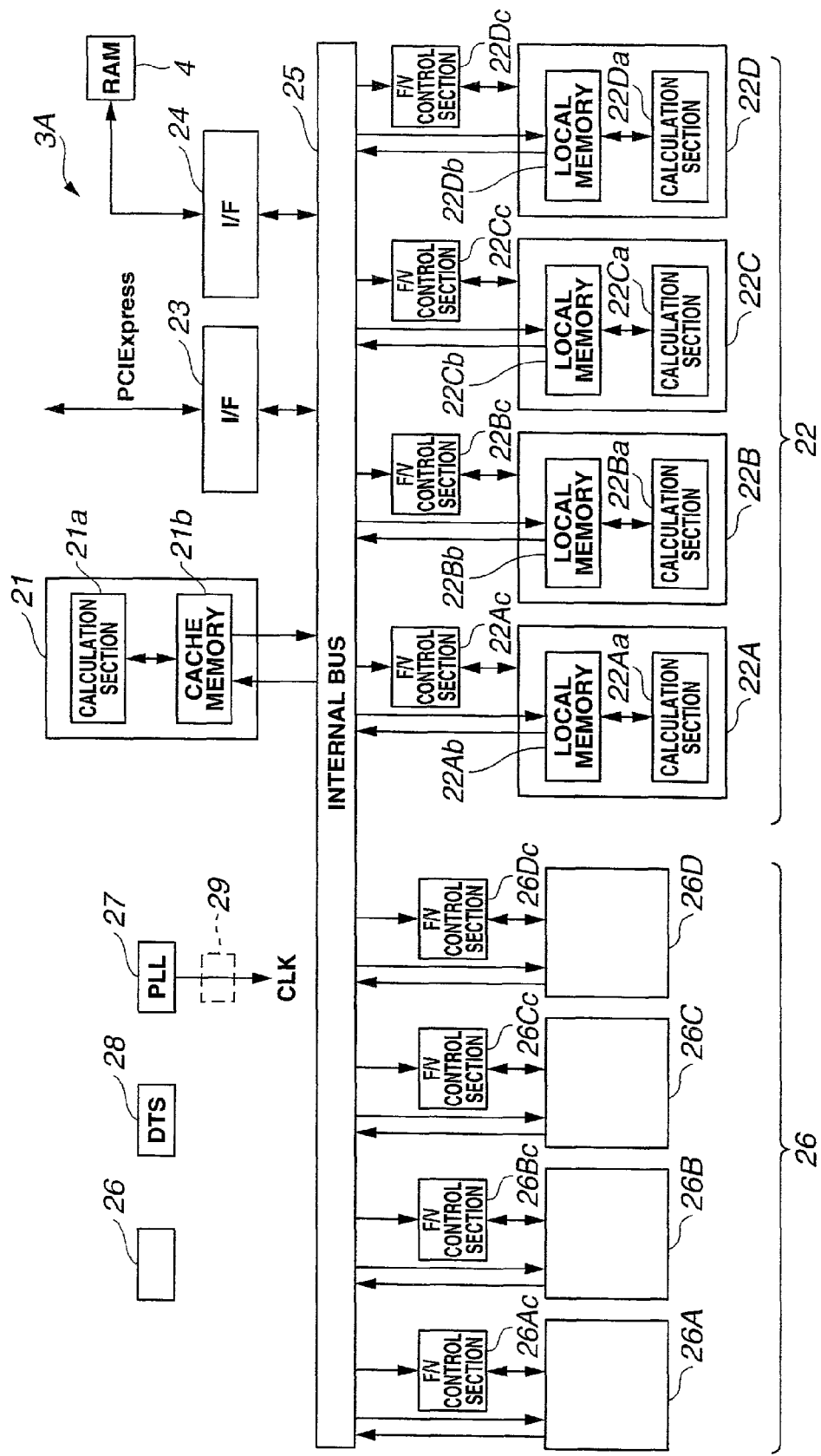
FIG. 9 is a block diagram showing a configuration of the accelerator according to a second embodiment of the present invention.

FIG. 9 is a block diagram showing a configuration of an AC 3A according to the second embodiment. Same components as the AC 3 of the first embodiment are attached with same reference characters and descriptions thereof are omitted.

As shown in FIG. 9, the AC 3A has multiple (here, two) encoders 26A and 26B and multiple (here, two) decoders 26C and 26D as the hard macros, which are connected to the CPE 21 via the internal bus 25, respectively. Hereinafter, the encoders 26A and 26B and the decoders 26C and 26D will be collectively referred to as "hard macro 26", or one of them will be referred to as "hard macro 26".

The hard macro 26 is a hardware engine unit, and is not such a general purpose processing unit as the PE 22 which can execute the received program. The PE 22 is the general purpose processing unit which can execute the process depending on the program, whereas contents of a process in the hard macro 26 are realized by hardware such as an ASIC, in which the process is executed when control data for the operation and the target data are given.

In the present embodiment, it is assumed that the AC 3A is configured so that the AC 3A can execute two processes, that is, an encoding process and a decoding process for the image data in image processes in MPEG4, H264, VC1 and the like, by the hard macro 26. The two encoders 26A and 26B are hardware circuits capable of processing the encoding process in parallel based on the request from the CPE 21. Also, the two decoders 26C and 26D are hardware circuits capable of processing the decoding process in parallel based on the request from the CPE 21.

Therefore, the AC 3A can execute the encoding or decoding process, or both of the encoding and decoding processes, by using the hard macro 26 capable of processing each process in parallel, separately from the process in the PE 22.

Moreover, the encoders 26A and 26B and the decoders 26C and 26D are provided with F/V control units 26Ac, 26Bc, 26Cc and 26Dc (hereinafter collectively referred to as "F/V control unit 26c", or one F/V control unit will be referred to as "F/V control unit 26c"), respectively. Each F/V control unit 26c is an operation control unit configured to control both the operation and a processing capability of the corresponding hard macro 26, and specifically, is a circuit having a function configured to change the frequency of the clock signal supplied to the corresponding hard macro 26, a function configured to supply and stop the clock signal supplied to each circuit in the hard macro 26, and a function configured to supply and stop the power supplied to each circuit in the hard macro 26.

Thus, when the application program is executed in the information processing apparatus 1, the change of the frequency of the clock signal, the supply and the stop of the clock signal and the supply and the stop of the power are performed under the control of the CPE 21, depending on usage states of the encoders 26A and 26B and the decoders 26C and 26D, or depending on whether or not to use the encoders 26A and 26B and the decoders 26C and 26D.

It should be noted that, also in the present embodiment, although the F/V control unit 26c is provided for each of the encoders 26A and 26B and the decoders 26C and 26D, one F/V control unit 26c may be provided with respect to the whole of the encoders 26A and 26B and the decoders 26C and 26D, and the change of the frequency of the clock signal, the supply and the stop of the clock signal, and the supply and the stop of the power may be performed with respect to the whole thereof. Also in that case, similarly to the first embodiment, the output of the PLL circuit 27 is outputted via the switching circuit 29, and the control signal configured to stop the supply of the clock is supplied with respect to the switching circuit 29 from the CPE 21.

The respective functions are equal to the functions with respect to the PE 22 described in the first embodiment.

It should be noted that, also in the present embodiment, although each F/V control unit 26c controls both the operation and the processing capability of the corresponding hard macro 26, each F/V control unit 26c may control at least one of the operation and the processing capability.

Then, the calculation unit 21a of the CPE 21 controls each PE 22, each hard macro 26 and each of the F/V control units 22c and 26c, as will be described later. Thus, the control of the operation and the processing capability of the calculation unit 22a by each F/V control unit 22c, and the control of the operation and the processing capability of the hard macro 26 by each F/V control unit 26c are performed in response to the instruction from the calculation unit 21a of the CPE 21.

When the calculation unit 21a which is the control unit receives the command of executing the predetermined process from the CPU 11 the calculation unit 21a outputs a predetermined instruction with respect to the four PEs 22 and the four hard macros 26, depending on the command. The predetermined instruction includes an instruction on which PE 22 or which hard macro 26 executes the process, an instruction on which operating frequency is provided at that time, and the like.

Hereinafter, the operation of the AC 3A will be described, for example, in the case where the AC 3A performs the decoding process and the image recognition process for the image data, with respect to image data captured and obtained by the camera or the like. It should be noted that the image recognition process and the decoding process may be simultaneously performed or may not be simultaneously performed, and further may be performed in synchronization with each other or asynchronously.

Similarly to the first embodiment, if the CPU 11 requests and causes the AC 3A to perform the image recognition application program, the CPU 11 outputs the predetermined command with respect to the AC 3A. The AC 3A receives the command and performs the process of the application program specified by the CPU 11. In that case, the image recognition application program is executed in the PE 22, and the operation of the PE 22 based on the load information and the degree of parallelism information in that case is similar to the operation in the first embodiment. In other words, based on the load information and the degree of parallelism information on the image processing program, the CPE 21 determines the operations of the multiple PEs 22.

The flow of the process in the CPU 11 in that case is similar to FIGS. 3 and 4. In other words, the CPU 11 transmits the image recognition program to the AC 3A, and the calculation unit 21a of the CPE 21 stores the image recognition program from the CPU 11 in the RAM 4. Then, the CPU 11 transmits the address of the target data which is the target of the image recognition process, the address of the result data of the recognition process, the load information on the image recognition program, and the degree of parallelism information on the image recognition program to the AC 3A. The AC 3A accumulates the received load information and the received degree of parallelism information in the RAM 4.

On the other hand, if the CPU 11 requests and causes the AC 3A to perform the decoding process for the image data, the CPU 11 outputs a predetermined command, which is different from the above described command for the image recognition process, with respect to the AC 3A. It should be noted that the CPU 11 may request the decoding process for the image data simultaneously with the above described request for the image recognition process, or separately from the above described request for the image recognition process. The AC 3A receives the command and performs the decoding process specified by the CPU 11, by using the hard macro 26.

Figures 10, 11:
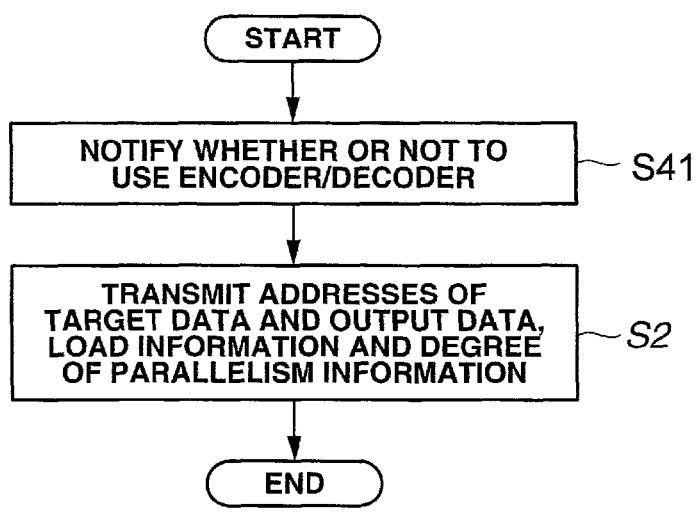
FIG. 10 is a flowchart showing an example of the flow of the process in the CPU according to the second embodiment of the present invention.
FIG. 11 is a diagram showing an example of table data showing load information and degree of parallelism information on a decoding process according to the second embodiment of the present invention.

FIG. 10 is a flowchart showing an example of the flow of the process in the CPU 11 in that case.

If the CPU 11 causes the AC 3A to share the decoding process for the image data, the CPU 11 notifies whether or not to use the decoders 26C and 26D to the AC 3A (step S41). Since the CPU 11 requests the decoding process, the CPU 11 notifies that the decoders 26C and 26D are used, and consequently, it means that the CPU 11 has notified that the encoders 26A and 26B are not used.

Next, similarly to the case of FIG. 3, the CPU 11 transmits the address of the target data, the address of the result data, the load information, and the degree of parallelism information to the AC 3A (step S2). Here, the target data is target data of the decoding process, the result data is result data of the decoding process, the load information is load information on the target data of the decoding process, and the degree of parallelism information is degree of parallelism information on the decoding process. Here, the load information is determined depending on a resolution, a profile and the like of the image data which is the target data, because, for example, the load of the process becomes large when the resolution is high, and the load becomes small when the resolution is low. The AC 3A accumulates the received load information and the received degree of parallelism information in the RAM 4.

FIG. 11 is a diagram showing an example of table data showing the load information and the degree of parallelism information on the decoding process. As shown in FIG. 11, depending on a level of the resolution of the image data, the load information and the degree of parallelism information have been previously set. Although not shown, table data similar to FIG. 11 has also been prepared with respect to the encoding process.

Since the process of the image recognition program in the CPE 21 is similar to FIGS. 5 to 7 in the first embodiment, a description thereof is omitted.

Figure 12:
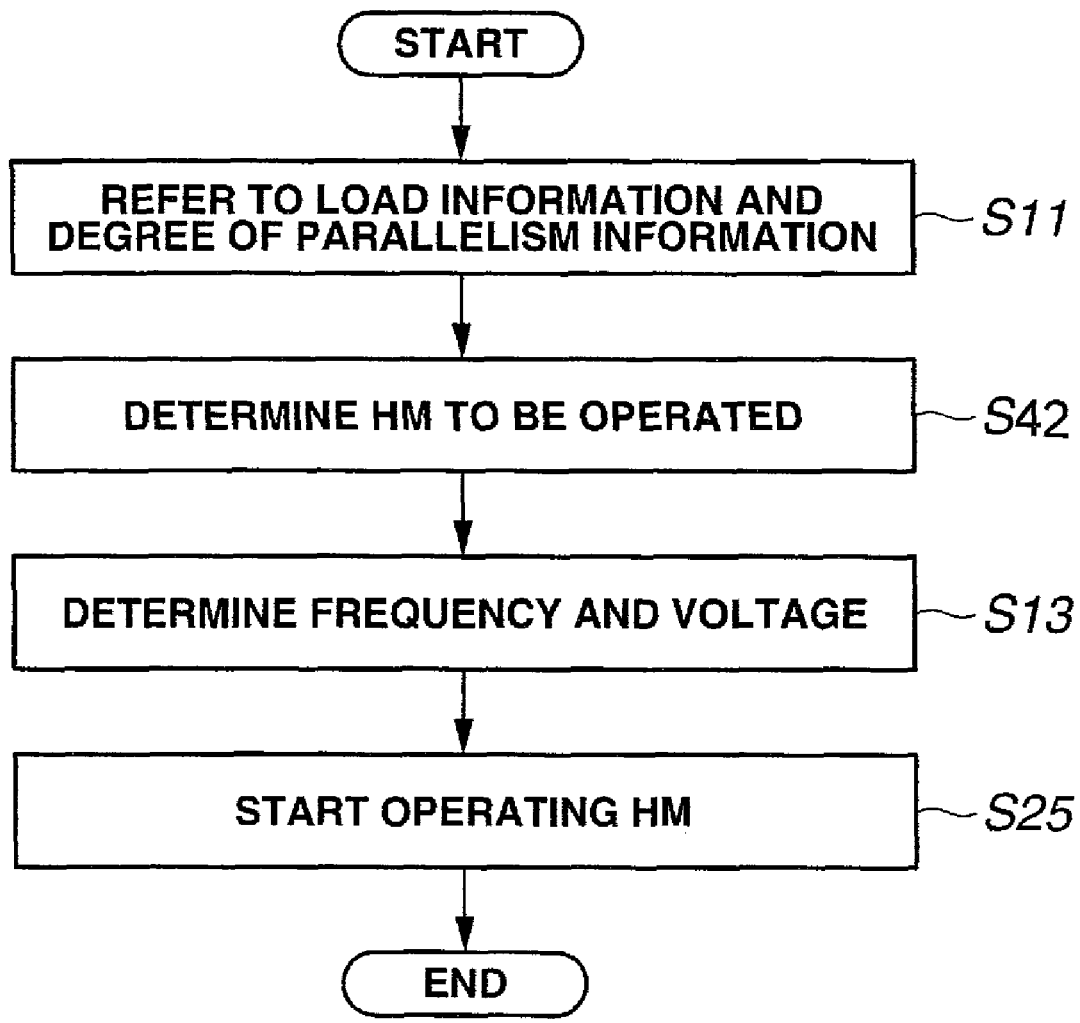
FIG. 12 is a flowchart showing an example of the decoding process in the CPE according to the second embodiment of the present invention.

The decoding process will be described by using FIG. 12. FIG. 12 is a flowchart showing an example of the decoding process in the CPE 21.

When the above described decoding process is requested from the CPU 11, the CPE 21 refers to the received load information and the received degree of parallelism information, and stores the load information and the degree of parallelism information in the RAM 4 (step S11).

The CPE 21 determines the hard macro (HM) to be operated, based on the load information and the degree of parallelism information (step S42). In other words, the CPE 21 couples the load information with the degree of parallelism information to determine one or more hard macros (HMs) to be operated, and the number of operating hard macros 26 is determined.

Here, since the requested process is the decoding process, the two decoders 26C and 26D are available, and if the degree of parallelism information is "2", the two hard macros 26C and 26D are determined as the operating hard macros.

Then, similarly to the first embodiment, based on the received load information and the received degree of parallelism information, the CPE 21 can determine at which operating frequency each hard macro 26 can execute the process. Furthermore, if there is any hard macro which does not perform the decoding process, such a hard macro 26 is controlled to minimize the power consumption, for example, the supply of the power thereto is stopped.

Therefore, the CPE 21 determines the operating frequency and the supply voltage of each of the determined one or more hard macros 26 to be operated (step S13). Thus, the clock signal is not supplied and also the power required for the calculation process is not supplied with respect to non-operating hard macros 26. Since a method configured to determine the operating frequency and the supply voltage depending on the load with respect to the hard macro 26 at step S13 is the same as the method configured to determine the operating frequency and the supply voltage depending on load power with respect to the PE 22 which has been described in FIG. 6 of the first embodiment, a description thereof is omitted.

Next, the CPE 21 outputs the start instruction with respect to the operating hard macro (HM) 26 (step S25). When the hard macro (HM) 26 receives the start instruction, the hard macro (HM) 26 reads and obtains the target data of the decoding process from the specified address, applies the decoding process to the target data, and outputs the result data of the decoding process to the specified address. At this time, each hard macro 26 is operating according to the operating frequency and the voltage notified and set to the F/V control unit 26c.

As described above, in addition to the multiple general purpose processing units, the AC 3A has the multiple hard macros, and the CPE 21 determines the operations of the multiple hard macros, based on the load information and the degree of parallelism information on the data to be processed.

Thus, according to the present embodiment since the AC 3A autonomously determines the sharing of the process among the multiple PEs 22 and the multiple hard macros 26 therein, also determines the operation and the processing capability in consideration of the power consumption, and executes the process requested by the CPU 11, the AC 3A can perform the requested process with the optimal power consumption.

It should be noted that, in the above described example, although an example in which the processes performed by the hard macro are the encoding and the decoding of the image data has been described, in addition, for example, the process may be a physical simulation process (a process of simulating a physical phenomenon in a virtual space), a WIFI communication process, an encryption operation (coding/decryption) process and the like.

As described above, according to the above described embodiments, it is possible to realize the accelerator and the information processing apparatus in which the accelerator having the multiple calculation units which can execute the program by processing the program in parallel and can determine the sharing among the multiple calculation units in the accelerator itself to execute the program.

The present invention is not limited to the above described embodiments, and various modifications, alterations and the like are possible within a range not changing the gist of the present invention.

What is claimed is:

1. An information processing apparatus comprising:
    a computing device including:
        a Central Processing Unit;
        a first input/output control unit connected to the Central Processing Unit for controlling the input/output of signals to/from the Central Processing Unit; and
        a second input/output control unit, connected to the Central Processing Unit via the first input/output control unit, for controlling the input/output of signals to/from the Central Processing Unit; and
        an accelerator operable to execute a program and connected to the second input/output control unit, the accelerator including:
        a plurality of calculation units, each calculation unit operable to execute the program in parallel with one or more of the other calculation units;
        an operation control unit configured to control an operation capability or a processing capability for each of the plurality of calculation units; and
        a control unit configured to determine, for execution of the program, an operation or processing capability for each of the plurality of calculation units based on load information associated with the program and cause the operation control unit to control the plurality of calculation units, wherein during execution of the program the plurality of calculation units operate according to the operation or processing capability determined for each of the calculation units and wherein the accelerator receives, from the Central Processing Unit, the program and the load information associated with the program prior to the execution of the program, and the load information comprises information indicating a weight of the program.

2. The apparatus of claim 1, wherein the operation or processing capability for each of the plurality of calculation units is determined based additionally on degree of parallelism information associated with the program and the accelerator receives, from the Central Processing Unit, the degree of parallelism information.

3. The apparatus of claim 2, wherein determining an operation or processing capability for each of the plurality of calculation units comprises determining a number of the plurality of the calculation units to be operated during execution of the program.

4. The apparatus of claim 3, wherein the number of the plurality of calculation units to operate is determined based on the degree of parallelism information.

5. The apparatus of claim 4, wherein determining an operation capability for one of the plurality of calculation units comprises determining whether to supply power to that calculation unit.

6. The apparatus of claim 5, wherein determining a processing capability for one of the plurality of calculation units comprises determining an operating frequency of a clock signal to be supplied to that calculation unit or a supply voltage to provide to that calculation unit.

7. The apparatus of claim 6, wherein the processing capability of each of the plurality of calculation units is determined based on the number of the calculation units to be operated and the load information.

8. The apparatus of claim 7, the determination of the processing capability for each of the plurality of calculation units is based on a ratio of the load information to the number of the plurality of calculation units to be operated.

9. The apparatus of claim 1, wherein the accelerator includes a Random Access Memory to store the program and the load information received from the Central Processing Unit.

10. The apparatus of claim 9, wherein the accelerator is operable to execute the program independently of the Central Processing Unit.

11. An information processing apparatus comprising:
    a computing device including:
        a Central Processing Unit;
        a first input/output control unit connected to the Central Processing Unit for controlling the input/output of signals to/from the Central Processing Unit; and
        a second input/output control unit, connected to the Central Processing Unit via the first input/output control unit, for controlling the input/output of signals to/from the Central Processing Unit; and
        an accelerator operable to execute a program and connected to the second input/output control unit, the accelerator including:
        a plurality of calculation units, each calculation unit operable to execute the program in parallel with one or more of the other calculation units;
        a plurality of hardware engine units, each hardware engine unit operable to execute a predetermined process with respect to target data, wherein each hardware engine unit is operable to execute the predetermined process in parallel with one or more of the other hardware engine units;

an operation control unit configured to control an operation or a processing capability for each of the plurality of calculation units and each of the plurality of hardware engine units; and a control unit configured to determine, for execution of the program, an operation capability or processing capability for each of the plurality of calculation units based on first load information associated with the program, determine an operation capability or processing capability for each of the plurality of hardware engine units based on second load information associated with the target data and cause the operation control unit to control the plurality of calculation units wherein during execution of the program the plurality of calculation units operate according to the operation or processing capability determined for each of the calculation units, and to control the plurality of hardware engine units wherein during execution of the predetermined process the plurality of hardware engine units operate according to the operation or processing capability determined for each of the hardware engine units and wherein the accelerator receives, from the Central Processing Unit, the program and the target data, the first load information associated with the program and the second load information associated with the target data prior to the execution of the program, wherein the first load information comprises information indicating a weight of the program and the second load information comprises information on a weight of the target data.

12. The apparatus of claim 11, wherein the operation capability or processing capability for each of the plurality of calculation units is additionally based on first degree of parallelism information associated with the program, the operation capability or processing capability for each of the plurality of hardware engine units is additionally based on second degree of parallelism information associated with the target data and the accelerator receives, from the Central Processing Unit the first degree of parallelism information associated with the program and the second degree of parallelism information associated with the target data.

13. The apparatus of claim 12, wherein determining an operation or processing capability for each of the plurality of calculation units comprises determining a number of the plurality of the calculation units to be operated during execution of the program and determining an operation or processing capability for each of the plurality of hardware engine units comprises determining a number of the plurality of the hardware engine units to be operated during execution of the predetermined process.

14. The apparatus of claim 13, wherein the number of the plurality of calculation units to operate is determined based on the first degree of parallelism information and the number of the plurality of the hardware engine units to operate is determined based on the second degree of parallelism information.

15. The apparatus of claim 14, wherein determining an operation capability for one of the plurality of calculation units comprises determining whether to supply power to that calculation unit and determining an operation capability for one of the plurality of hardware engine units comprises determining whether to supply power to that hardware engine unit.

16. The apparatus of claim 15, wherein determining a processing capability for one of the plurality of calculation units comprises determining an operating frequency of a clock signal to be supplied to that calculation unit or a supply voltage to provide to that calculation unit and wherein determining a processing capability for one of the plurality of hardware engine units comprises determining an operating frequency of a clock signal to be supplied to that hardware engine unit or a supply voltage to provide to that hardware engine unit.

17. The apparatus of claim 16, wherein the processing capability of each of the plurality of calculation units is determined based on the number of the calculation units to be operated and the first load information and wherein the processing capability of each of the plurality of hardware engine units is determined based on the number of the hardware engine units to be operated and the second load information.

18. The apparatus of claim 17, wherein the determination of the processing capability for each of the plurality of calculation units is based on a ratio of the first load information to the number of the plurality of calculation units to be operated and the determination of the processing capability for each of the plurality of hardware engine units is based on a ratio of the second load information to the number of the plurality of hardware engine units to be operated.

19. The apparatus of claim 12, wherein the accelerator includes a Random Access Memory to store the program and the first and second load information received from the Central Processing Unit.

20. The apparatus of claim 19, wherein the accelerator is operable to execute the program independently of the Central Processing Unit.

* * * * *